M. J. & P. P. ADAMS.
WHEEL HUB.
APPLICATION FILED AUG. 13, 1909.
1,003,577.
Patented Sept. 19, 1911.
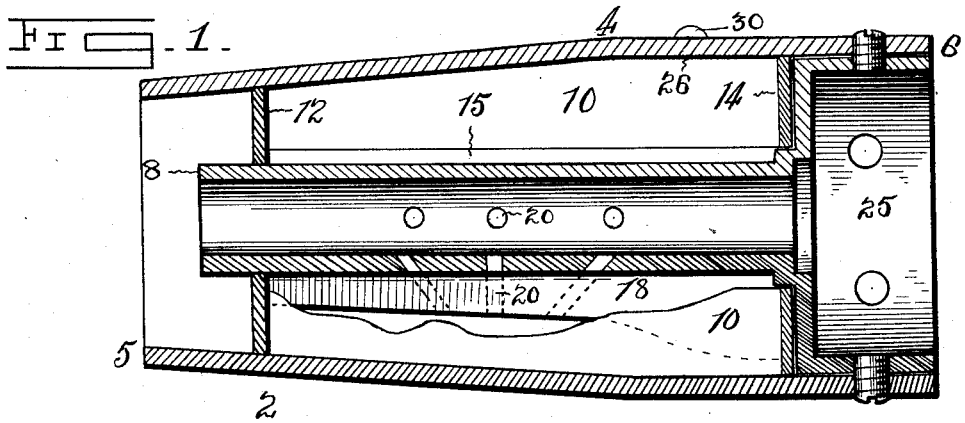
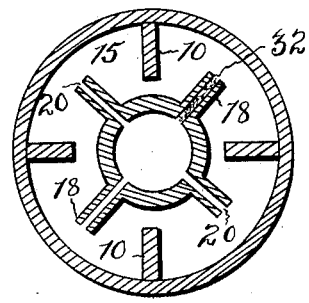
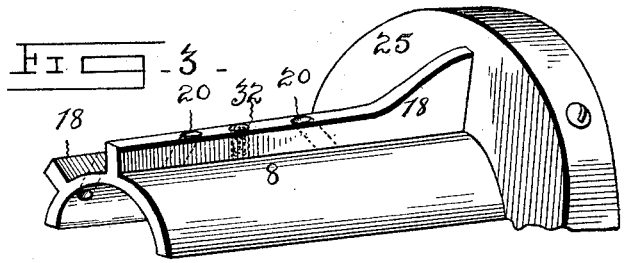
Witnesses.
E. M. Noonan
O. M. Frick
Inventors
Matthias J. Adams
Peter P. Adams
By
W. W. Cady
Attorney
COLUMBIA PLANOGRAPH CO., WASHINGTON, D. C.

UNITED STATES PATENT OFFICE.

MATTHIAS J. ADAMS AND PETER PAUL ADAMS, OF TURKEY RIVER, IOWA.

WHEEL-HUB.

1,003,577.  Specification of Letters Patent.  Patented Sept. 19, 1911.

Application filed August 13, 1909. Serial No. 512,758.

*To all whom it may concern:*

Be it known that we, MATTHIAS J. ADAMS and PETER P. ADAMS, both citizens of the United States, residing at Turkey River, in the county of Clayton and State of Iowa, have invented certain new and useful Improvements in Wheel-Hubs, of which the following is a specification.

Our invention relates to hubs for wheels with special reference to automatic oiling devices and the object is to provide a hub that will automatically distribute just the amount of oil along the axle to keep the axle oiled sufficiently for its most efficient work, also to prevent all dirt and dust from sifting in upon the axle, and all the sediment of the oil from coming in contact with the axle and thereby preventing any gumming of the axle. Further to feed to the axle only the amount of oil necessary, and thereby prevent all waste and overflow and keep the ends of the axle and hub clean. In what it consists, its manner of construction and mode of operation will be fully set out and described in the following specification when taken in connection with the drawing, accompanying the same and forming a part hereof in which:—

Figure 1 is a longitudinal section of the hub. Fig. 2 is a cross section of the hub. Fig. 3 is a detail perspective of a portion of the hub.

Like characters of reference denote corresponding parts in each of the figures.

In the drawings, 2 designates the hub which is preferably made of barrel shape with greater diameter at 4 and tapering toward the ends 5. In the center of the hub is an axle box 8. The hub 2 is considerably larger than the axle box and in the space between are partitions 10 attached to the inner side of the hub, and extending to near the axle box. There is also secured to the hub at each end circular plates 12 and 14 which are provided with openings at their centers through which the axle box is inserted and in which it is secured.

It will be seen that between the plates 12 and 14 and between the hub and axle box there will be a plurality of chambers 15 preferably opening into each other, in which the oil for lubricating the axle is stored.

In order to strengthen the hub and still maintain lightness resulting from the construction of a hollow hub and also to provide a convenient and sure means for controlling the even and equal distribution of the oil along the axle, there is securely attached to the axle box 8 panel stays 18, that are also secured at one end to the shield 25 and extend to or nearly to the plate 12, where they contact with the plate 12. These panel stays are provided with one or more openings 20 which extend cross wise through the stays 18 and open into the axle box. To the inner end of these stays 18 and to the axle box 8 is secured a shield 25 adapted to project over the shoulder on the axle and prevent sand and dirt from coming in contact with the inner portion of the axle outside of the axle box. Through the hub there is an opening 26 through which the oil is delivered into the chambers 15 and this opening may be closed by a screw cap 30.

The manner in which our device operates is substantially as follows: The lubricant is poured into the chambers 15 through the opening 26, and as the wheel revolves the oil will be constantly carried to the top of the stays 18 and a trifle at each revolution will enter the openings 20 and pass onto the axles. If there be a too free delivery of the oil to the axle at any time, then a cotton packing 32 may be inserted in the openings 20, and thus control the delivery of the oil to the axle. As the wheel revolves, particularly at high speed, the heavier parts of the oil including sediment and gummy material, will be thrown outwardly against the hub member 4 and the sediment, including any gritty material, will be gradually separated from the pure oil because of the action of the partition members 10. The panel members 18, being outstanding from the axle box, will prevent relative rotation of the inner surface of the oil and the axle box. Light linty material upon the surface of the oil, which if introduced into the friction surfaces might cause a gumming and heating of the surfaces, will therefore be collected between the panels and the axle box. The panels 18 dipping into the clear portion of the oil, will insure that the friction surfaces are always supplied from the best portion of the lubricant contained in the chamber formed between the hub 8 and the barrel. Therefore, it will be seen that the partition members 10 and the panel members 18 automatically separate deleterious matter from the pure oil.

It will be seen by this mode of construction that the delivery of the oil to the axle will always be completely controlled, and that there will be no waste of the oil and besides the sediment of the oil will remain in the chambers 15 and hence there will be no "gumming" of the oil on the axle or at either end. The sediment of the oil may be removed from the chambers through the opening 26 by removing the screw cap 30.

Having now described our invention what we claim is:—

1. A device of the class described comprising an axle box, a series of panels carried by said axle box, said panels being provided with transverse openings which open into the interior of said axle box, a barrel member surrounding said axle box, and partition members carried by said barrel member between said panels carried by said axle box, substantially as described.

2. A device of the class described comprising an axle box, panel members formed integral with said axle box, a barrel member attached to said axle box in such manner as to form a chamber between said axle box and said barrel member, partition members carried by said barrel member, said panel members being provided with openings which communicate from said chamber to the interior of said axle box.

3. A device of the class described comprising an axle box, panel members extending radially from said axle box, a barrel member surrounding said axle box in such manner as to form a chamber between the axle box and the barrel member, partition members carried by the barrel member and extending between the panel members carried upon the axle box, said panel members and said partition members forming said chamber into a continuous torsional passage surrounding said axle box, said panel members being provided with openings which communicate from the chamber to the interior of said axle box.

In testimony whereof we affix our signatures in presence of two witnesses.

MATTHIAS J. ADAMS.
PETER PAUL ADAMS.

Witnesses:
M. M. CADY,
E. M. NOONAN.

Copies of this patent may be obtained for five cents each, by addressing the "Commissioner of Patents, Washington, D. C."